United States Patent
Rihn et al.

(10) Patent No.: US 10,078,370 B2
(45) Date of Patent: Sep. 18, 2018

(54) DEVICES AND METHODS FOR MODIFYING HAPTIC EFFECTS

(71) Applicant: Immersion Corporation, San Jose, CA (US)

(72) Inventors: William Rihn, San Jose, CA (US); Stephen Rank, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/807,765

(22) Filed: Nov. 9, 2017

(65) Prior Publication Data

US 2018/0143688 A1 May 24, 2018

Related U.S. Application Data

(60) Provisional application No. 62/425,795, filed on Nov. 23, 2016.

(51) Int. Cl.

| | |
|---|---|
| *G08B 23/00* | (2006.01) |
| *G06F 3/01* | (2006.01) |
| *A63F 13/285* | (2014.01) |
| *G08B 6/00* | (2006.01) |
| *G08B 21/18* | (2006.01) |

(52) U.S. Cl.
CPC ............ *G06F 3/016* (2013.01); *A63F 13/285* (2014.09); *G08B 6/00* (2013.01); *G08B 21/182* (2013.01)

(58) Field of Classification Search
CPC ......... G06F 3/016; A63F 13/285; G08B 6/00; G08B 21/182
See application file for complete search history.

(56) References Cited

U.S. PATENT DOCUMENTS

| | | | |
|---|---|---|---|
| 7,965,276 B1 | 6/2011 | Martin et al. | |
| 9,142,104 B2 * | 9/2015 | Nakamura | G06F 3/016 |
| 2010/0123588 A1 * | 5/2010 | Cruz Hernandez | A61B 5/02438 340/573.1 |
| 2011/0021272 A1 * | 1/2011 | Grant | A63F 13/10 463/30 |
| 2012/0121138 A1 * | 5/2012 | Fedorovskaya | G02B 27/017 382/107 |

(Continued)

FOREIGN PATENT DOCUMENTS

EP 2955609 A1 12/2015

OTHER PUBLICATIONS

European Patent Office. European Search Report. European Application No. 17 20 2938. Date of Completion: Feb. 2, 2018. English Language. 8 pages.

*Primary Examiner* — Joseph Feild
*Assistant Examiner* — Rufus Point
(74) *Attorney, Agent, or Firm* — Medler Ferro WoodHouse & Mills PLLC

(57) ABSTRACT

Devices and methods for modifying haptic effects are provided. The devices may include computer systems and haptic enabled devices. A haptic output command configured to produce desired haptic effects may be determined. Fatigue levels may be determined according to haptic effect density of performed haptic effects and inputs received from control devices. According to fatigue levels, modified haptic effects may be determined to replace the desired haptic effects and corresponding haptic output commands may be generated and output to haptic output devices.

26 Claims, 10 Drawing Sheets

(56) References Cited

U.S. PATENT DOCUMENTS

| | | | |
|---|---|---|---|
| 2012/0134543 A1* | 5/2012 | Fedorovskaya | H04N 13/0033 382/107 |
| 2013/0046544 A1* | 2/2013 | Kay | G06F 3/04883 704/275 |
| 2014/0253303 A1* | 9/2014 | Levesque | G08B 6/00 340/407.1 |
| 2014/0267076 A1 | 9/2014 | Birnbaum et al. | |
| 2014/0347176 A1* | 11/2014 | Modarres | G06F 3/016 340/407.1 |
| 2015/0293592 A1* | 10/2015 | Cheong | G06F 3/016 345/173 |
| 2016/0132114 A1 | 5/2016 | Rihn | |
| 2017/0076564 A1* | 3/2017 | Cruz-Hernandez | G08B 6/00 |

\* cited by examiner

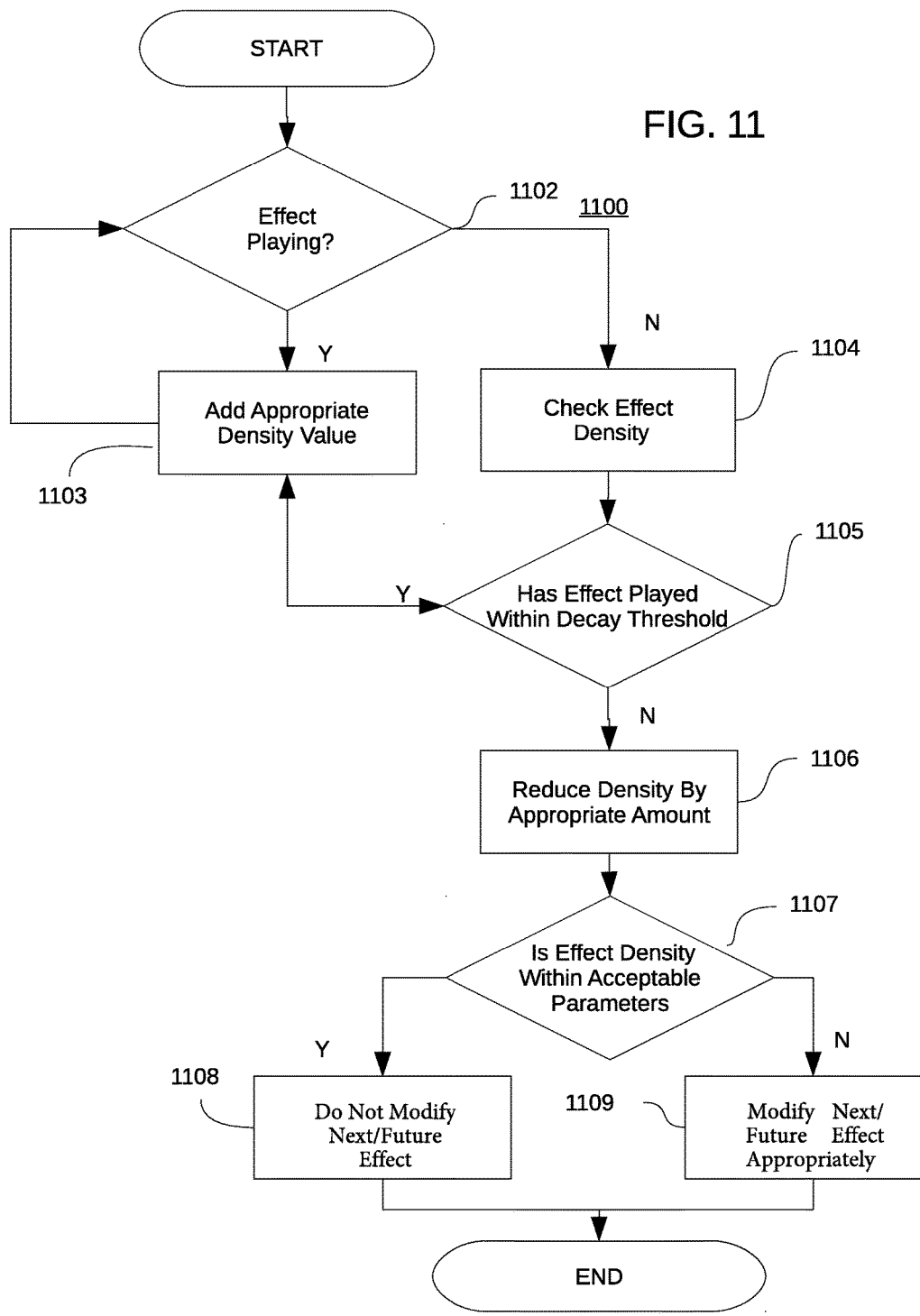

DEVICES AND METHODS FOR MODIFYING HAPTIC EFFECTS

CROSS-REFERENCE TO RELATED APPLICATIONS

This application claims the benefit of prior U.S. Provisional Patent Application Ser. No. 62/425,795, filed Nov. 23, 2016, which is hereby incorporated by reference in its entirety for all purposes.

FIELD OF THE INVENTION

Embodiments hereof relate to devices and methods for modifying haptic effects, and, in particular, for modifying haptic effects according to user fatigue levels.

BACKGROUND OF THE INVENTION

Video games and virtual reality systems have become ever more popular due to the marketing toward, and resulting participation from, casual gamers. In a typical implementation, a computer system displays a visual or graphical environment to a user on a display device. Users can interact with the displayed environment by inputting commands or data from a controller or peripheral device. The computer updates the environment in response to the user's manipulation of a moved manipulandum such as a joystick handle and provides visual feedback to the user using a display screen.

Conventional video game devices or controllers use visual and auditory cues to provide feedback to a user. In some controller or peripheral devices, kinesthetic feedback (such as active and resistive haptic feedback) and/or tactile feedback (such as vibration, texture, and heat) is also provided to the user, more generally known collectively as "haptic feedback" or "haptic effects." Haptic feedback can provide cues that enhance and simplify the user controller or peripheral device. For example, vibration effects, or vibrotactile haptic effects, may be useful in providing cues to users of electronic devices to alert the user to specific events, or provide realistic feedback to create greater sensory immersion within a simulated or virtual environment. Conventional haptic feedback systems for gaming and other devices generally include an actuator for generating the haptic feedback attached to the housing of the controller/peripheral. More particularly, motors or other actuators of the controller or peripheral device are housed within the controller and are connected to the controlling computer system. The computer system receives sensor signals from the controller or peripheral device and sends appropriate haptic feedback control signals to the actuators. The actuators then provide haptic feedback to a user of the controller. The computer system can thus convey physical sensations to the user in conjunction with other visual and auditory feedback.

Gaming peripherals may include triggers, buttons, joysticks, joypads, etc., that are used to control events in the game. These triggers can include haptic features to further enhance and provide a more immersive experience for the player. The gaming peripheral may have one or more triggers and the trigger actuator may provide vibrotactile and/or kinesthetic haptic effects.

Haptic effects on gaming peripheral triggers can increase immersion in a video game, but can also induce fatigue during long gameplay sessions. Fatigue can manifest in many ways, including physical fatigue due to long periods of haptic feedback and perception fatigue where haptic effects are not perceived as strongly due to overstimulation. Others have tried to solve this by weakening haptic effects overall or by pre-programmed fading out of effects. However, this does not provide an optimal haptic and immersive experience in the greatest number of situations, as it is very hard to predict how a user will proceed in a given video game.

BRIEF SUMMARY OF THE INVENTION

In an embodiment, a device for modifying haptic output to a haptic enabled device is provided. The device may comprise at least one processor configured to execute computer instructions to determine a haptic output command including instructions to activate a haptic output device to perform an original haptic effect, determine a fatigue level indicative of an amount of user fatigue based on at least one of haptic output commands transmitted to the haptic output device and inputs received from a control device, compare the fatigue level to a fatigue threshold, and determine a replacement haptic output command including instructions to activate the haptic output device to perform a modified haptic effect, instead of the original haptic effect, based on the comparison the fatigue level to the fatigue threshold.

In another embodiment, a computer implemented method for modifying haptic output is provided. The method may be carried out by at least one processor executing computer instructions. The method may include determining, by the at least one processor, a haptic output command including instructions to activate a haptic output device to perform an original haptic effect, determining, by the at least one processor, a fatigue level indicative of an amount of user fatigue based on of haptic output commands transmitted to the haptic output device and inputs received from a control device, comparing, by the at least one processor, the fatigue level to a fatigue threshold, and determining, by the at least one processor, a replacement haptic output command including instructions to activate the haptic output device to perform a modified haptic effect, instead of the original haptic effect, based on the comparison of the fatigue level to the fatigue threshold.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 11 is a process diagram illustrating operation of a system for modifying haptic effects consistent with an embodiment hereof.

DETAILED DESCRIPTION OF THE INVENTION

Figure 1:
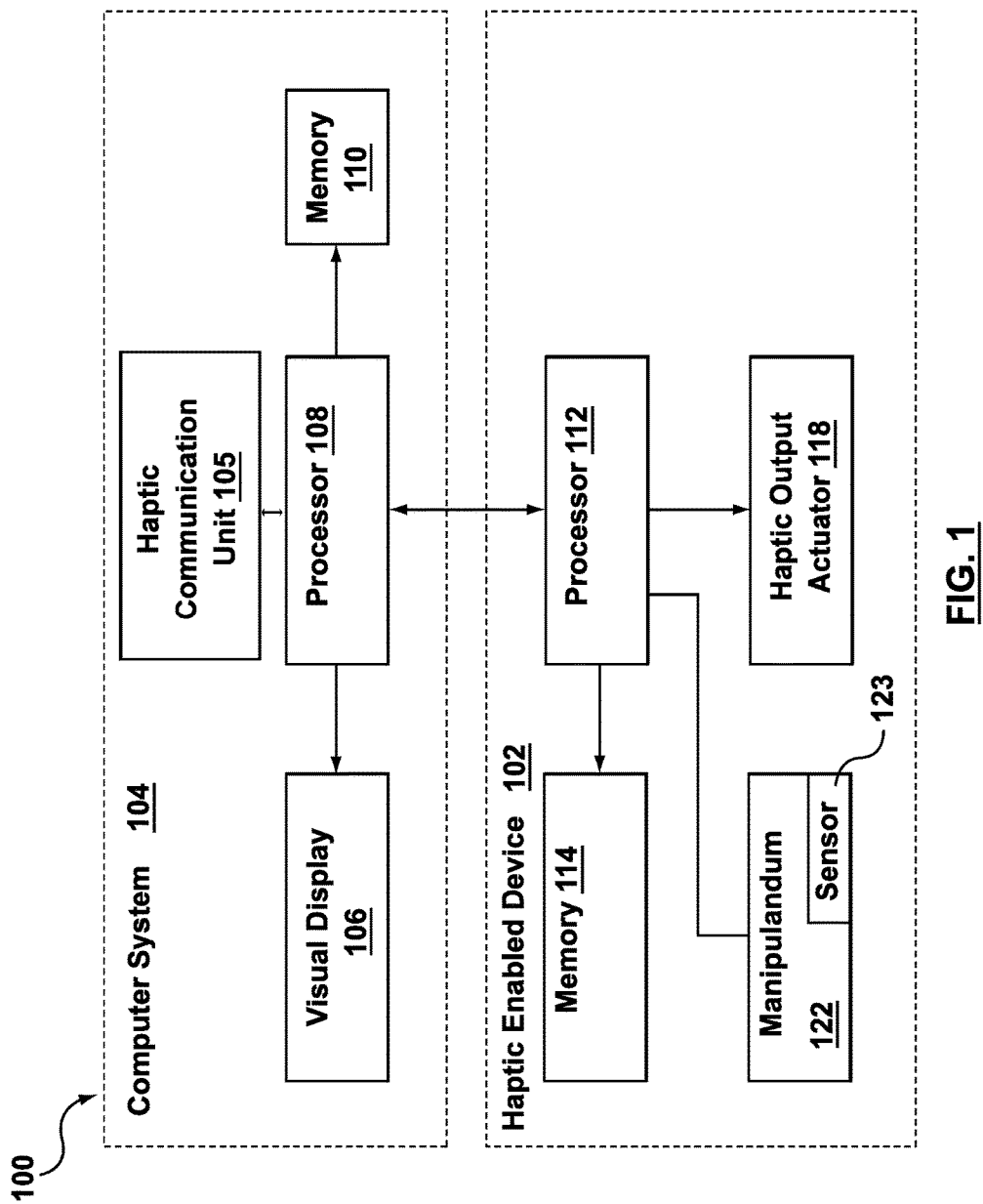
FIG. 1 is a block diagram of a system for providing haptic output commands to a haptic enabled device according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is primarily directed to gaming devices and controllers for gaming devices, those skilled in the art would recognize that the description applies equally to other systems, including virtual reality systems and peripherals for the virtual reality systems.

Embodiments of the present invention are directed to a tracking system or automated relief system for preventing or reducing user fatigue or numbness during the use of a control device and/or a device including a haptic actuator. The solution may include a software and/or firmware component and may be implemented by computer instructions performed by at least one processor. The at least one processor may be located in a control device, a haptic device, and/or a central console to which such devices connect. The proposed solution enables automatic modification of haptic feedback based on a calculated fatigue level, which may be calculated according to haptic density as well as other measurements indicative of user fatigue. Haptic density refers to a combination of different values characterizing haptic effects, including intensity or magnitude, time duration, number, frequency of repetition, and any other characteristic of a haptic effect. Other measures of user fatigue may include measures of control device use, including measures of control device activations, such as trigger pulls and button pushes, joypad and joystick use, as well as overall time spent actively using a control device. According to the computed fatigue level, the system may modify haptic effects to reduce their intensity, number, duration, frequency, etc., and/or may provide haptic assistance to a user. The system thus enables haptic effects to be rendered in a dynamic and automatically adjusted manner to allow haptic effects reflecting game play to be optimally felt by the user.

Embodiments described herein relate to devices and systems that may include one or more of a computer system and a haptic enabled device.

A computer system consistent with the present invention may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to provide a haptic output command. In some implementations, computer systems consistent with the present invention may include cloud based computer platforms. The computer system may include one or more processors (also interchangeably referred to herein as processors, processor(s), or processor for convenience), one or more storage devices, a haptic communication unit or units, and/or other components. Computer system processors may be programmed by one or more computer program instructions to carry out methods described herein. As used herein, for convenience, the various instructions may be described as performing an operation, when, in fact, the various instructions program the processors (and therefore the computer system) to perform the operation. Haptic communication units consistent with the present invention may include any connection device, wired or wireless, that may transmit or communicate a haptic output command. For example, a haptic communication unit may include a wireless device, such as a Bluetooth antenna, configured to communicate with a haptic enabled peripheral device to deliver a haptic output command for causing a haptic effect to be performed by the haptic enabled peripheral device. A haptic communication unit may further include a wired port for communicating a haptic output command. In some implementations, a haptic communication unit may be a dedicated unit configured solely for delivering a haptic output command. In some implementations, a haptic communication unit may further function to deliver a myriad of other communications, wired or wirelessly, to an external device.

Haptic enabled devices include devices having one or more haptic output devices for delivering a haptic effect to a user. In some implementations, haptic enabled devices may be devices that include one or more haptic output devices that directly receive haptic commands, for example, from a computer system, for actuation. In some implementations, haptic enabled devices may further include one or more processors that may process or interpret a received haptic output signal before delivering an actuation signal to one or more haptic actuators. In some implementations, haptic enabled devices may further include user input elements, e.g., control elements such as triggers, buttons, joysticks, joypads, etc., to permit a user to interact with a computer system. Haptic enabled devices may include haptic enabled devices—devices designed to function as accessory or peripheral units to a central device, such as a computer system consistent with embodiments hereof. Haptic enabled devices may also, in some embodiments, further include all of the functionality of computer systems consistent with the present invention. Thus, a haptic enabled device may function as a computer system and may include haptic output devices and control elements.

Haptic output commands may be used to directly or indirectly cause actuation and/or activation of a haptic output device. In some implementations, haptic output commands may include haptic output signals, transmitted via wires or wirelessly, to cause a haptic output device to produce a haptic effect. Haptic output signals may include actuation signals received by a haptic output device to cause the haptic effect. Haptic output signals may also include signals transmitted between other system components with information about a desired haptic effect. For example, a computer system processor may output a haptic output signal containing information about haptic effects to occur to a processor associated with a haptic enabled device. The haptic enabled device may receive the haptic output signal, process it, and output another haptic output signal to a haptic output device to cause a haptic effect. Thus, a haptic output signal may include any signal to be used for generating a haptic effect. Haptic output commands may further include software commands. That is, a software interaction may generate a haptic output command including information for causing a haptic output device actuation. A haptic output command in the form of a software command may cause the generation of a haptic output command in the form of a haptic output signal by a processor.

In some implementations, haptic output commands may make up haptic tracks, i.e., information indicative of a series of haptic effects to be caused. A haptic track may include a predetermined sequence of haptic output commands intended to be executed in order. The methods, systems, and devices discussed herein for generating modified haptic output commands may similarly be applied to generating modified haptic tracks.

According to some embodiments, processors associated with the computer system and/or a haptic enabled device may be configured to modify a haptic output command for the haptic output device depending on determined fatigue levels. Varying or modifying haptic effects according to determined fatigue levels may be performed using various combinations of devices and systems discussed herein. For example, an example computer system may communicate a haptic output command to a processor of a haptic enabled device, which may then modify the haptic output command before outputting a modified haptic output command to a haptic output device. In another example, a computer system processor may internally modify a software based haptic output command prior to generating and transmitting the haptic output command for causing haptic output device actuation. Various other combinations of devices and systems discussed herein may be used to provide haptic command modification according to fatigue level, and any specific examples discussed herein are not intended to be limiting.

FIGS. 1-7 illustrate systems and devices consistent with embodiments hereof for modifying haptic commands according to determined fatigue levels indicative of user fatigue.

Figure 2:
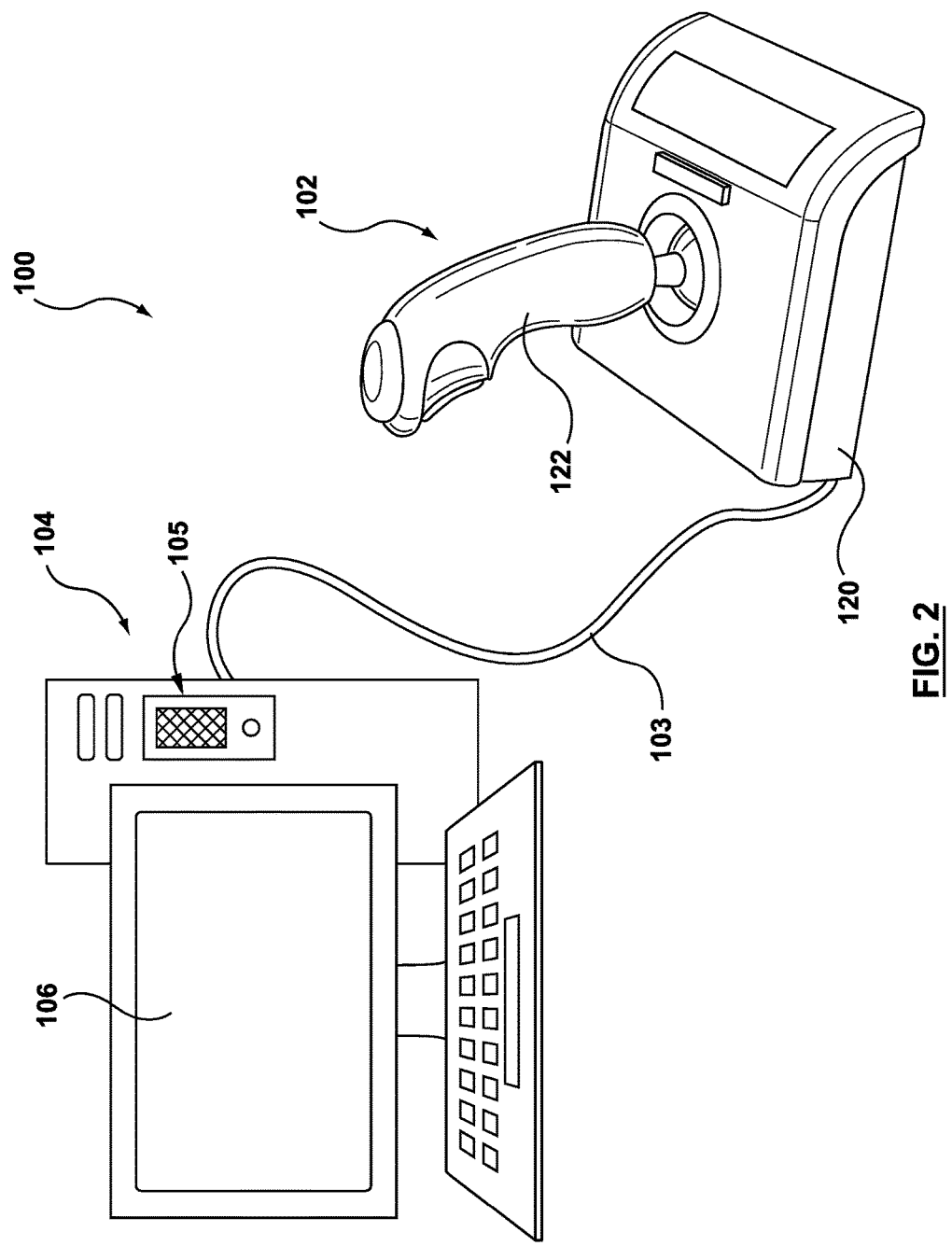
FIG. 2 is a schematic illustration of the system of FIG. 1, wherein the haptic enabled device is a haptic joystick.
Figure 4:
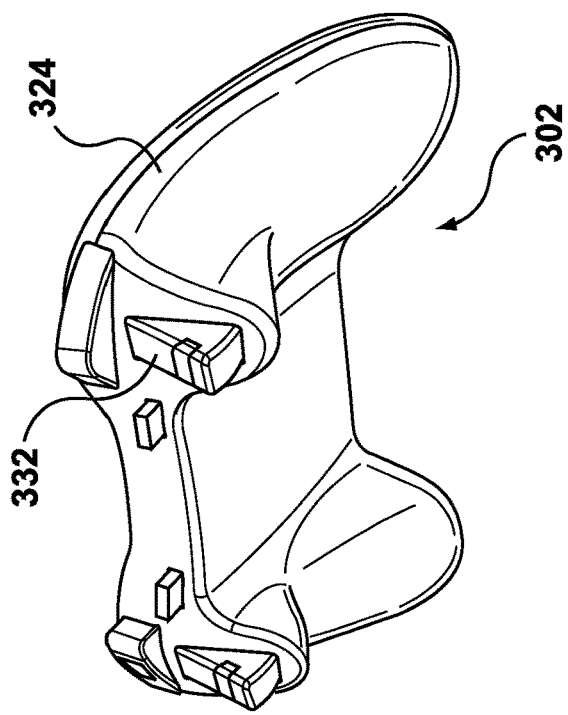
FIGS. 3 and 4 are perspective views of a haptic enabled device according to an embodiment hereof, wherein the haptic enabled device is a handheld gaming controller.
Figure 3:
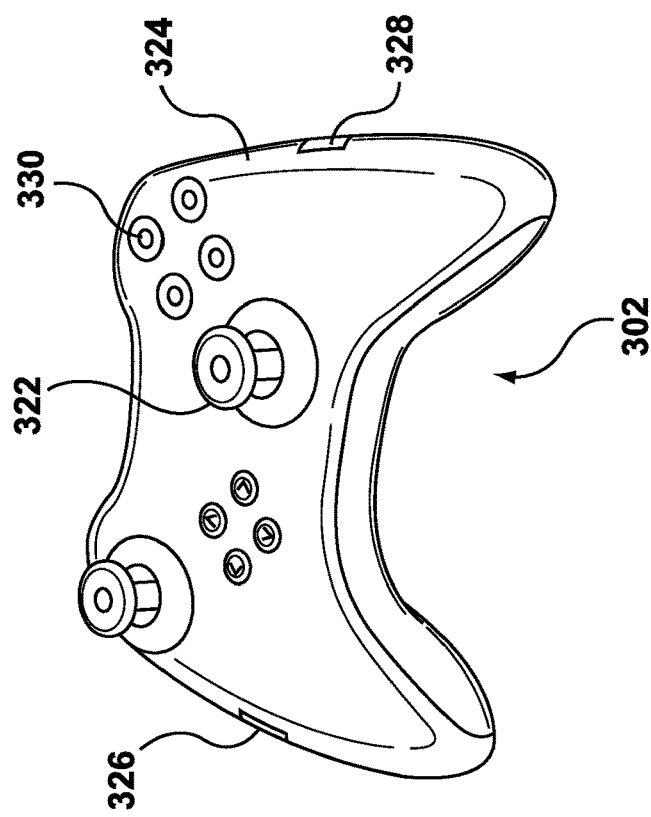
Figure 5:
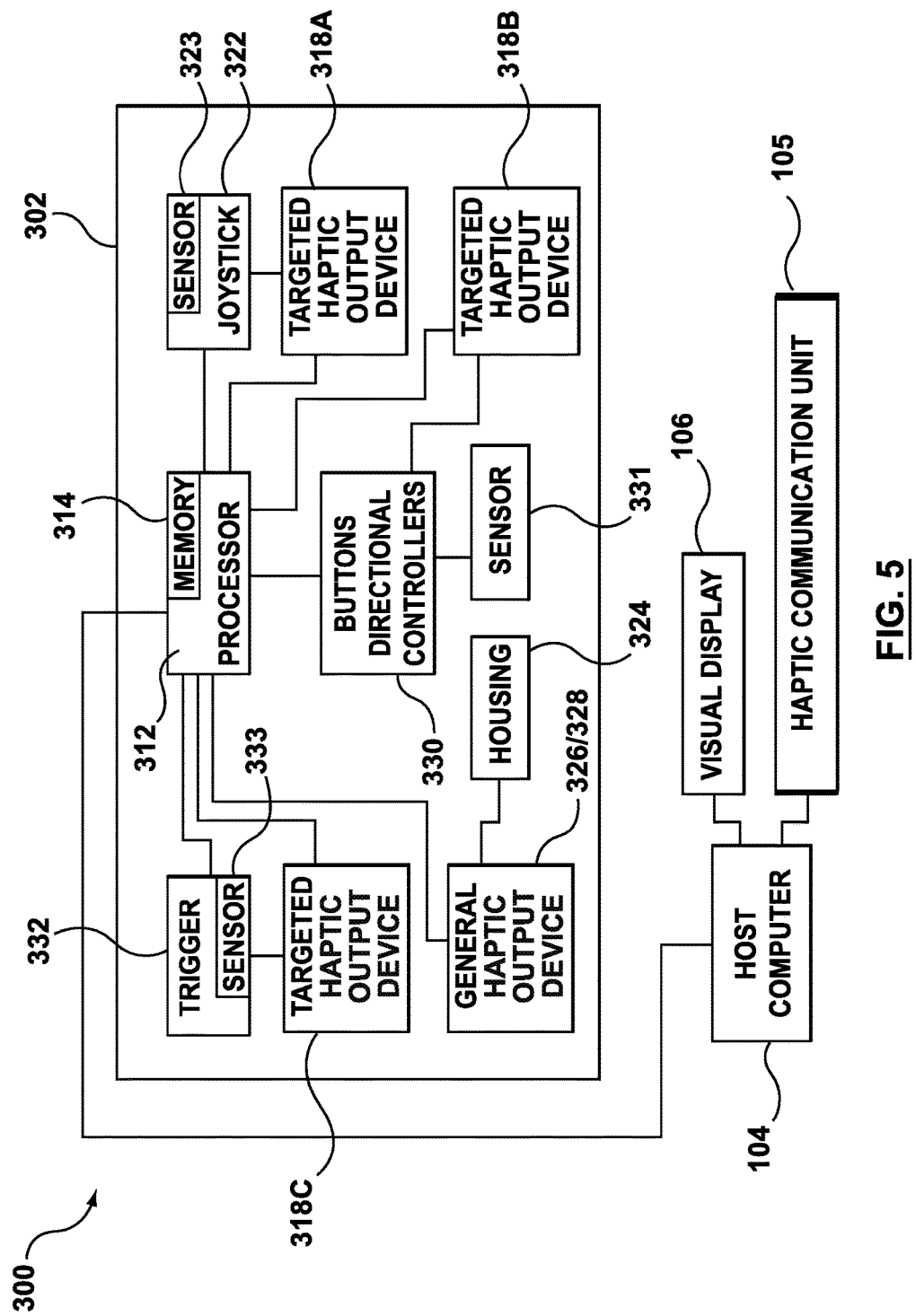
FIG. 5 illustrates a block diagram of the gaming controller of FIGS. 3 and 4.
Figure 6:
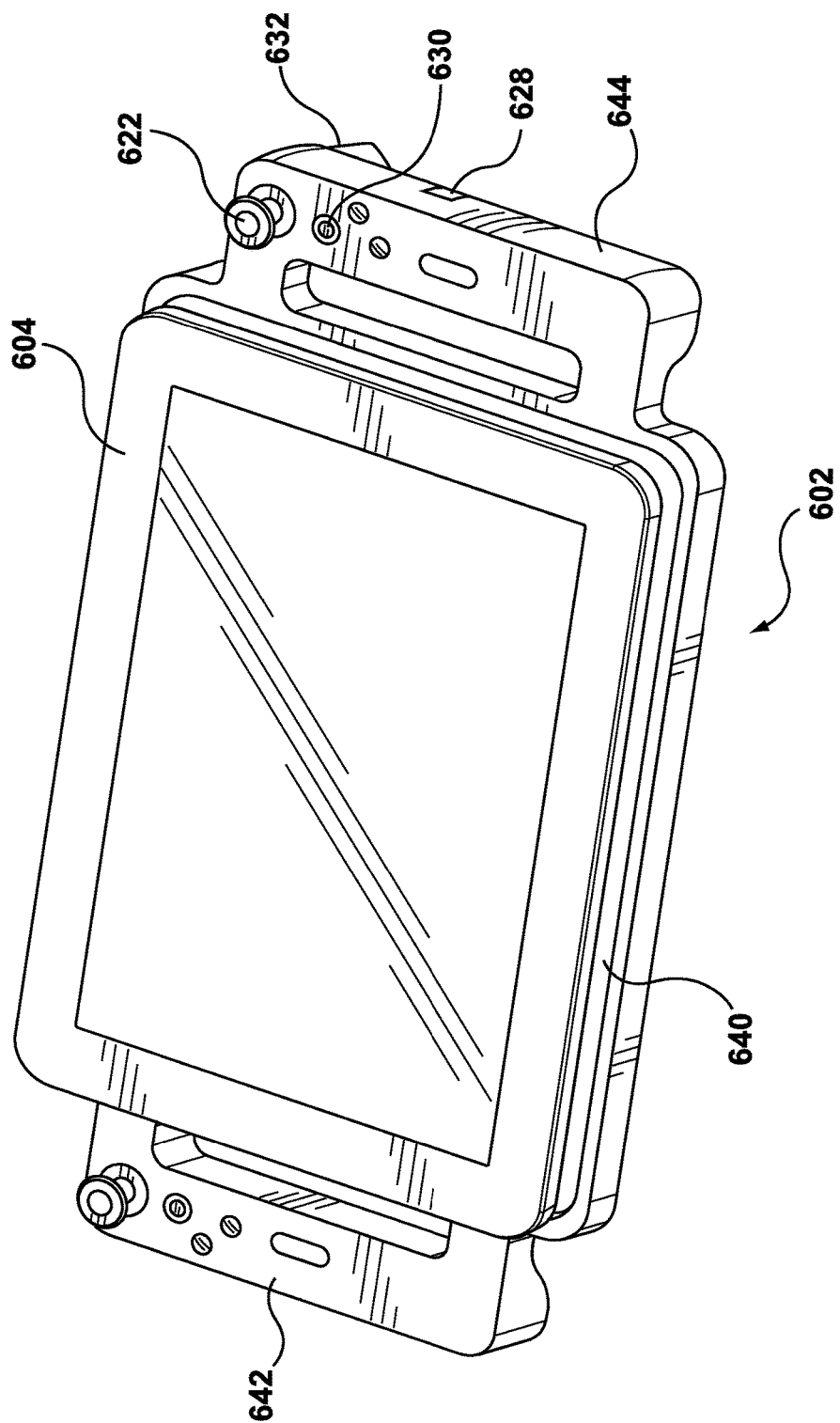
FIG. 6 is a perspective view of a system for providing haptic output commands to a haptic enabled device according to an embodiment hereof, wherein the haptic enabled device is a gaming tablet controller that may be used with a tablet computer.
Figure 7:
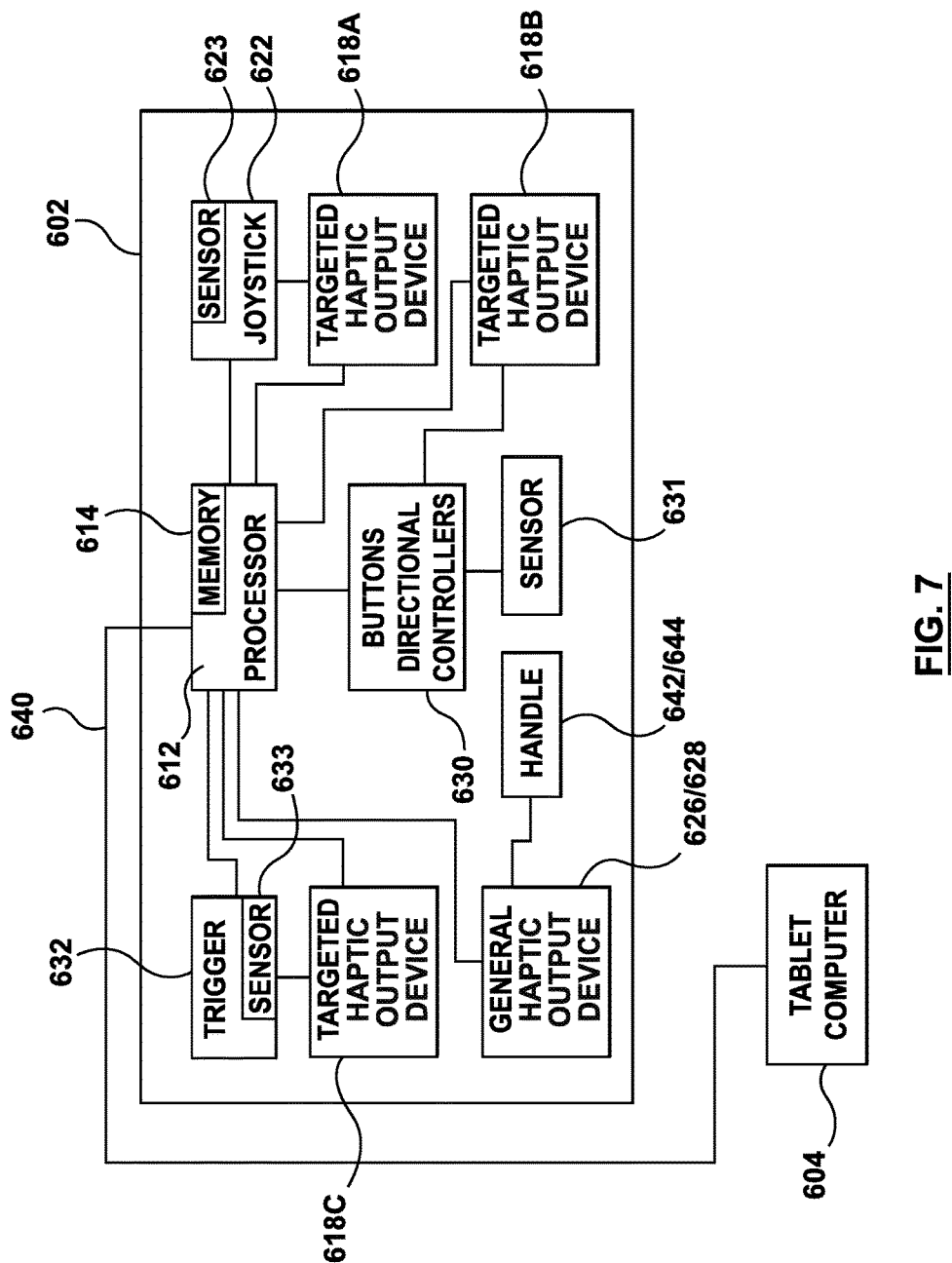
FIG. 7 illustrates a block diagram of the system of FIG. 6.

FIG. 1 is a block diagram of a system 100 for providing haptic feedback to a haptic enabled device 102 according to an embodiment hereof and FIG. 2 is a schematic illustration of the system of FIG. 1. In the embodiment of FIGS. 1-2, the haptic enabled device 102 includes a haptic joystick with a manipulandum 122. Those skilled in the art will recognize that the haptic joystick is merely an example embodiment of a haptic enabled device and that haptic enabled devices with other configurations, shapes, and sizes may be used. For example, as described in more detail herein, the haptic enabled device may be a handheld gaming controller 302 for a gaming system as shown in FIGS. 3-5 which is of similar shape and size to many "gamepads" currently available for video game console systems, a haptic enabled device 602 that may be used with a tablet computer 604 as shown in FIGS. 6-7, or other controllers that having user input (UI) elements such as, but not limited to, mobile phones, personal digital assistants (PDA), tablets, computers, gaming peripherals, and other controllers for virtual reality systems known to those skilled in the art.

With reference to the embodiment of FIGS. 1-2, the haptic enabled device 102 may be in communication, wired or wireless, with a computer system 104. Computer system 104 may further include a visual display 106, and may be configured to generate a virtual environment to a user on a display, for example a screen and/or a headset. As shown in FIG. 2, computer system 104 may include at least one processor 108, a memory 110, and the visual display 106. Computer system 104 may execute software instructions stored in the memory 110 and executed by the processor 108. Processor 108 may include one or more of any type of general purpose processor, and may also be a processor specifically designed to provide haptic effect signals. Processor 108 may be the same processor that operates the entire computer system 104, and/or may be a separate processor. Processor 108 may execute computer instructions to determine haptic commands to send to the haptic enabled device 102 and in what order to send the haptic commands. Memory 110 may include one or more of any type of storage device or non-transitory computer-readable medium, such as but not limited to random access memory (RAM) or read-only memory (ROM). Memory 110 may also be located internal to the host processor, or any combination of internal and external memory.

Computer system 104 may be coupled to the visual display 106 via wired or wireless means. Visual display 106 may include any type of medium that provides graphical information to a user; including, but not limited to, one or more monitors, television screens, plasmas, LCDs, projectors, or any other display devices. In an embodiment, the computer system 104 may be a gaming device console and the visual display 106 may be a monitor coupled to the gaming device console, as known in the art. In another embodiment, as known to those skilled in the art, the computer system 104 and the visual display 106 may be combined into a single device.

Computer system 104 also may include a haptic communication unit 105. The haptic communication unit 105 may include a wired or wireless communication unit. The haptic communication unit 105 may be configured to transmit or otherwise convey haptic commands to the haptic enabled device 102. In some implementations, haptic communication unit 105 may be dedicated to the provision of haptic commands. In some implementations, haptic communication unit 105 may be configured for a wide variety of communications tasks including, but not limited to, the provision of haptic commands. The additional communication tasks may include, for example, control inputs and outputs, outputs to additional accessory devices, and others.

As shown in FIGS. 1-2, the computer system 104 may be in communication with the haptic enabled device 102 through a wired connection 103. In further embodiments, the haptic enabled device 102 may communicate with the computer system 104 using wired and wireless communication means known to those of skill in the art. These may include but are not limited to a serial or Bluetooth connection. Further, computer system 104 may be in the cloud and thus may not be required to be wired or connected wirelessly in a local fashion.

As shown in FIG. 2, haptic enabled device 102 may include a housing or base 120 and manipulandum or user input device 122 which may move in one or more degrees of freedom. Haptic enabled devices 102 including manipulanda and/or other input receiving structures may further be referred to as control devices. Manipulandum 122 may extend from housing 120. Although FIG. 2 illustrates a joystick as the manipulandum of the haptic enabled device, it will be understood by one of ordinary skill in the art that the present disclosure is not limited to a joystick manipulandum, but also includes any devices moveable in, either in whole or in part, one or more degrees of freedom. Those skilled in the art will recognize that the joystick is merely an example embodiment of a manipulandum of a controller, and that manipulanda with other configurations such as triggers, buttons, or other user input elements may be used as will be described in more detail herein. In some implementations, haptic enabled devices 102 may include no input receiving structures and may be configured only for haptic output.

With additional reference to FIG. 1, haptic enabled device 102 may include a processor 112, a memory 114, a manipulandum sensor 123, and at least one haptic output device 118. Haptic enabled device 102 may be alternatively configured to not include processor 112, whereby all input/output signals from haptic enabled device 102 are handled and processed directly by computer system 104. Processor 112 may be coupled to haptic output device 118 to provide haptic output commands thereto based on haptic output commands received from computer system 104. Similar to the processor 108, processor 112 may determine haptic commands to send to the one or more haptic output device 118 to cause a haptic effect. In addition, if haptic enabled device 102 includes more than one haptic output device, processor 112 can determine which haptic output device will receive the haptic output command. In addition, similar to memory 110 of computer system 104, local memory 114 that may be any type of storage device or computer-readable medium, such as but not limited to random access memory (RAM) or read-only memory (ROM). Local memory 114 may also be located internal to the local processor, or any combination of internal and external memory.

Manipulandum 122 of haptic enabled device 102 may be physically moved within one or more degrees of freedom. For example, a user may move the manipulandum 122 forward, backwards, left or right. When a user moves manipulandum 122, manipulandum sensor 123 may detect the movement and/or position of the manipulandum and transmits a sensor signal to processor 112. Processor 112 may then communicate or transmits the sensor signal to computer system 104. Based on the received sensor signal, computer system 104 may perform actions within the video game and update the virtual environment. The movement of manipulandum 122 of haptic enabled device 102 represents input from the user which allows the user to interact with the software applications running on computer system 104, including but not limited to video games relating to first person shooter, third person character interaction, vehicle related games, or computer simulations. The movement of manipulandum 122 may provide computer system 104 with input corresponding to the movement of a computer generated graphical object, such as a cursor or other image, or some other graphical object displayed by the computer system 104 via visual display 106, or to control a virtual character or gaming avatar, such as a person, vehicle, or some other entity that may be found in a game or computer simulation.

In addition to receiving sensor signals from manipulandum sensor 123, processor 112 also may receive haptic output commands from computer system 104 relating to haptic effects to be output from haptic output device 118. Processor 112 may receive and process the haptic output commands to provide haptic output commands in the form of control, actuation, and/or drive signals to haptic output device 118 based on the high level haptic output commands received from computer system 104. Computer system 104 may provide high level haptic output commands to processor 112 such as the type of haptic effect to be output (e.g. vibration, jolt, detent, pop, etc.) by haptic output device 118. Processor 112 may instruct haptic output device 118 as to particular characteristics of the haptic effect which is to be output (e.g. magnitude, frequency, duration, etc.) consistent with the haptic output commands. Processor 112 may retrieve the type, magnitude, frequency, duration, or other characteristics of the haptic effect consistent with the haptic output commands from local memory 114 coupled thereto. Depending on game actions and control signals received from computer system 104, the processor 112 may send haptic output commands to the haptic output device 118 to output one of a wide variety of haptic effects or sensations, including vibrations, detents, textures, jolts or pops.

Haptic output device 118 may be an inertial or kinesthetic actuator as known to those of ordinary skill in the art of virtual reality systems. Possible actuators include but are not limited to eccentric rotating mass ("ERM") actuators in which an eccentric mass is moved by a motor, linear resonant actuators ("LRAs") in which a mass attached to a spring is driven back and forth, piezoelectric actuators, electromagnetic motors in which an eccentric mass is moved by a motor, vibrotactile actuators, inertial actuators, shape memory alloys, electro-active polymers that deform in response to signals, mechanisms for changing stiffness, electrostatic friction (ESF), ultrasonic surface friction (USF), or any combination of actuators described above. Possible actuators further include kinesthetic and semi-kinesthetic force-feedback actuators. Such force-feedback actuators may include electromagnetic motors connected to the manipulandum 122 directly or via transmission linkage or gearing. In another embodiment, the actuator may use kinesthetic haptic feedback including, for example, solenoids to change the stiffness/damping of manipulandum 122 and/or housing 120, small air bags that change size in manipulandum 122 and/or housing 120, or shape changing materials. In some implementations, in which haptic enabled device 102 includes a trigger or button, haptic output device 118 may be a device configured to provide resistance or assistance for trigger pulls and button presses.

In some embodiments, the haptic enabled device 102 may further include additional sensors 126 as shown in FIG. 1. Additional sensors 126 may be sensors configured for collecting additional data related to potential fatigue levels of a subject. Additional sensors 126 may include, for example, biometric sensors such as temperature sensors, moisture sensors, galvanic skin response sensors, cameras, and others. Additional sensors 126 may further include force sensors configured to measure an amount of gripping force exerted on the housing 120 by a user.

As previously stated, haptic enabled device 102 is merely an example embodiment of a haptic enabled device and haptic enabled devices with other configurations, shapes, and sizes may be used. For example, FIGS. 3-5 illustrate another embodiment of a haptic enabled device 302 that may be utilized in embodiments consistent with embodiments hereof. FIGS. 3 and 4 are different perspective views of the haptic enabled device 302, wherein the haptic enabled device is a handheld gaming controller, while FIG. 5 illustrates a block diagram of haptic enabled device 302 used in a gaming system 300 that further includes computer system 104, haptic communication unit 105, and visual display 106. A housing 324 of haptic enabled device 302 is shaped to easily accommodate two hands gripping the device, either by a left-handed user or a right-handed user. Those skilled in the art would recognize that haptic enabled device 302 is merely an exemplary embodiment of a controller of similar shape and size to many "gamepads" currently available for video game console systems, and that controllers with other configurations of user input elements, shapes, and sizes may be used, including but not limited to controllers such as a Wii™ remote or Wii™ U Controller, Sony® SixAxis™ controller or Sony® Wand controller, an Xbox™ controller or similar controller, as well as controllers shaped as real life objects (such as tennis rackets, golf clubs, baseball bats, and the like) and other shapes.

Haptic enabled device 302 includes several user input elements or manipulanda, including a joystick 322, a button 330, and a trigger 332. As used herein, user input element refers to an interface device such as a trigger, button, joystick, or the like, which is manipulated by the user to interact with computer system 104. As can be seen in FIGS. 3-4 and known to those skilled in the art, more than one of each user input element and additional user input elements may be included on haptic enabled device 302. Accordingly, the present description of a trigger 332, for example, does not limit haptic enabled device 302 to a single trigger. Further, the block diagram of FIG. 5 shows only one of each of joystick 322, buttons and directional controllers 330, and trigger 332. However, those skilled in the art understand that multiple joysticks, buttons, and triggers, as well as other user input elements, may be used, as described above.

As can be seen in the block diagram of FIG. 5, haptic enabled device 302 may include targeted haptic output devices or motors 318A, 318B, 318C to directly drive each of the user input elements 322, 330, 332 thereof as well as one or more general haptic output devices 326, 328 coupled to housing 324 in a location where a hand of the user is generally located. Joystick 322 may include a targeted haptic output device or motor 318A coupled thereto, button 330 may include a targeted haptic output device or motor 318B coupled thereto, and trigger 332 may include a targeted haptic output device or motor 318C coupled thereto. In addition to a plurality of targeted haptic output devices, the haptic enabled device 302 may include a position sensor coupled to each of the user input elements thereof. Joystick 322 may include a position sensor 323 coupled thereto, button 330 may include a position sensor 331 coupled thereto, and trigger 332 may include a position sensor 333 coupled thereto. Processor 312 may be coupled to targeted haptic output devices 318A, 318B, 318C as well as position sensors 323, 331, 333 of joystick 322, button 330, and trigger 332, respectively. In response to signals received from position sensors 323, 331, 333, processor 312 may instruct targeted haptic output devices 318A, 318B, 318C to provide directed or targeted effects directly to joystick 322, button 330, and trigger 332, respectively. Such targeted effects are discernible or distinguishable from general or rumble haptic effects produced by general haptic output devices 326, 328 along the entire body of the controller. The collective haptic effects may provide the user with a greater sense of immersion to the game as multiple modalities are being simultaneously engaged, e.g., video, audio, and haptics. Similar to haptic enabled device 102 and computer system 104, haptic enabled device 302 may be configured to communicate with computer system 104, e.g., via haptic communication unit 105. Processor 312 of haptic enabled device 302 may be coupled to each haptic output device to provide haptic output commands based on high level haptic output commands received from computer system 104. The haptic output devices of haptic enabled device 302 may be any type of haptic output device listed herein for haptic output device 118 of haptic enabled device 102. Similar to the haptic enabled device 102, the haptic enabled device 302 may include additional sensors 126 configured to collect additional data related to potential fatigue levels of a subject, as shown in FIG. 5.

FIGS. 6-7 illustrate a haptic enabled device 602 according to another embodiment hereof in which haptic enabled device 602 is a gaming tablet controller that may be used with a tablet computer 604, which includes integrated visual and audio outputs as will be understood by one of ordinary skill in the art. Tablet computer 604 may be any type of tablet style computing device, including devices designed specifically for gaming activities, such as is available from Razer Inc., and commercially available devices, including, but not limited to, an Apple® iPad®, Kindle® Fire®, and Samsung® Galaxy Tab®. Haptic enabled device 602 may include a docking portion 640 configured to receive tablet computer 604 and handles 642, 644 with manipulanda disposed thereon for a user to control a game on tablet computer 604. Docking portion 640 may connect haptic enabled device 602 to tablet computer 604 such that actions by the user on handles 642, 644, such as pressing buttons, moving joysticks, pressing triggers, etc., result in actions on the game being played on tablet computer 604.

Handles 642, 644 include typical manipulanda or user input elements found on controllers. The manipulanda will be described with respect to handle 644. However, those skilled in the art would recognize that the same or similar manipulanda may be used on handle 642. In particular, handle 644 may include a joystick 622, a button 630, and a trigger 632. As can be seen in FIG. 6 and known to those skilled in the art, more than one of each of these user input elements may be included on each handle 642, 644. Further, handles 642, 644 include general or rumble haptic output devices 626, 628 attached thereto in a location where hands of the user are generally located for providing general or rumble haptic effects to handles 642, 644 as described above with respect to general or rumble haptic output devices 326, 328.

As shown in the block diagram of FIG. 7, haptic enabled device 602 may include a processor 612 which communicates with tablet computer 604 via docking portion 640. The block diagram of FIG. 7 shows only one of each of joystick 622, buttons and directional controllers 630, and trigger 632. However, those skilled in the art would understand that multiple joysticks, buttons, and triggers, as well as other user input elements, may be used, as described above. Processor 612 may be coupled to targeted haptic output devices 618A, 618B, 618C as well as position sensors 623, 631, 633 of joystick 622, button 630, and trigger 632, respectively. In response to signals received from position sensors 623, 631, 633, processor 612 instructs targeted haptic output devices 618A, 618B, 618C to provide directed or targeted effects directly to joystick 622, button 630, and trigger 632, respectively. Processor 612 of haptic enabled device 602 may be coupled to each haptic output device to provide haptic output commands thereto based on high level haptic output commands from tablet computer 604. The haptic output devices of haptic enabled device 602 may be any type of haptic output device listed herein for haptic output device 118 of haptic enabled device 102. Similar to the haptic enabled device 102, the haptic enabled device 602 may include additional sensors 126 configured to collect additional data related to potential fatigue levels of a subject, as shown in FIG. 7.

Although FIGS. 6-7 illustrate haptic enabled device 602 as a gaming tablet controller that may be used with a tablet computer 604, it will be understood by one of ordinary skill in the art that the haptic enabled device and the host or tablet computer may be within the same device or housing. The gaming tablet controller thus may be a gaming tablet that does not have an associated peripheral but rather the haptic output device is integrated into the gaming tablet itself as a single device.

Regardless of which haptic enabled device configuration or embodiment is utilized, the computer system processor and/or the processor of the haptic enabled device may be configured to modify a haptic output command according to a determined fatigue level indicative of user fatigue. The system processor and/or the device processor may create a haptic output command configured to generate modified haptic effects as compared to those originally intended. For example, software instructions executed on a computer system processor may include original haptic output commands to generate an intended haptic effect or effects. Prior to the transmission of the original haptic output commands to the appropriate haptic output devices, a replacement haptic output command configured to generate modified haptic effects may be determined by various aspects of the system. For example, the computer system processor may include additional software instructions for determining fatigue levels and generating a replacement haptic output command indicating modified haptic output effects. That is, both the desired haptic effects and the modified haptic effects may be determined by executable software instructions within an application. In another example, the computer system processor may output a haptic output command indicative of the originally intended haptic effects to another processor associated with a connected haptic enabled device. The processor of the haptic enabled device may determine a fatigue level and make the comparisons necessary to determine whether to modify the haptic effect or effects to be caused. Any or all of the operations discussed below with respect to the determination of haptic output commands for causing haptic effects and haptic effect modifications may be carried out by processors associated with the computer system and/or with a haptic enabled device. Furthermore, the haptic output commands may be processed and modified at the level of software instructions and/or at the level of electrical signals.

Figure 8:
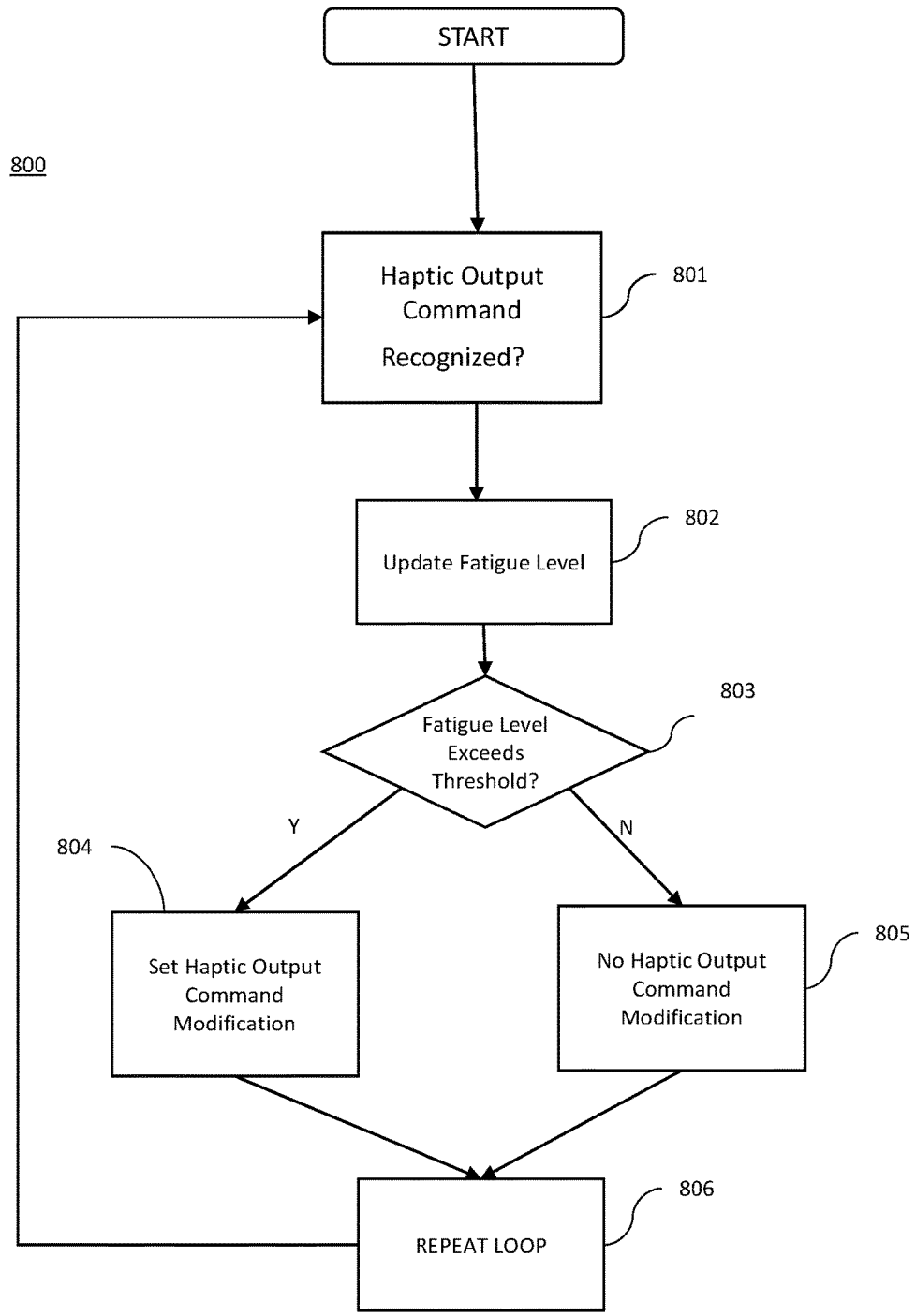
FIG. 8 is a process diagram illustrating operation of a system for modifying haptic effects, consistent with an embodiment hereof.
Figure 9:
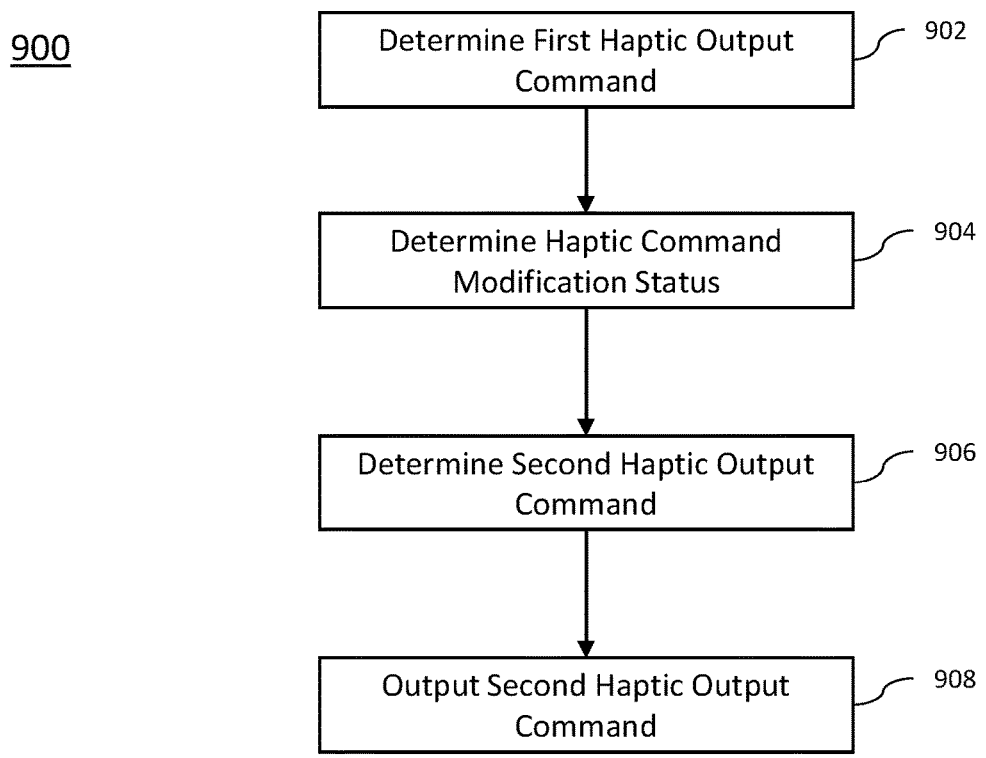
FIG. 9 is a process diagram illustrating operation of a system for modifying haptic effects, consistent with an embodiment hereof.

FIGS. 8 and 9 are process diagrams illustrating functionality of systems described herein in carrying out a haptic modification process. In embodiments, the functionality of the process diagrams of FIGS. 8 and 9 may be implemented by software and/or firmware stored in the memory of the computer system and executed by the processor of the computer system, and/or the memory of the haptic enabled device and executed by the processor of the haptic enabled device. In other embodiments, the functionality may be performed by hardware, through the use of an application specific integrated circuit ("ASIC"), a programmable gate array ("PGA"), a field programmable gate array ("FPGA"), and/or any combination of hardware and software. In some embodiments, functionality of the process diagrams of FIGS. 8 and 9 may be carried by processors associated with both the computer system and the haptic enabled device. It will be understood by one of ordinary skill in the art that the functionality of FIGS. 8 and 9 may be performed by devices and systems consistent with the computer system 104, the haptic enabled device 102, the haptic enabled device 302, the haptic enabled device 602, and/or a haptic enabled device or computer system having another configuration as known in the art.

FIG. 8 is a process diagram illustrating a control loop 800 of a haptic modification determination process in accordance with embodiments hereof. In an embodiment as illustrated in FIG. 8, the system may operate to monitor and update computed fatigue levels on a continuous ongoing basis. The control loop 800 as illustrated in FIG. 8 may operate to monitor and increase or reduce the value of the determined fatigue level as required according to the occurrence of haptic effects. When a fatigue level surpasses a threshold, a haptic output command modification flag may be set and subsequent haptic output commands may be modified according to the setting of the haptic output command modification flag. When the fatigue level diminishes below the threshold, the haptic output command modification flag may be removed. In further embodiments, as explained in detail below, the system may operate to monitor and update fatigue levels only when a haptic signal is received by the haptic device.

The control loop 800 of the haptic modification determination process may be a process loop executed by one or more processor associated with the systems and devices described herein. The control loop 800 may be executed by a processor associated with a computer system as described herein, and/or may be executed by a processor associated with a haptic enabled device as described herein. In some implementations, different operations of the control loop 800 may be performed by different processors in communication, including different processors located in different devices/systems.

As illustrated in FIG. 8, a haptic effect modification process may begin with recognition of haptic output commands by a processor at haptic output command recognition operation 801. A haptic output command may be configured to cause one or more haptic effects at one or more haptic actuators. Recognition of a haptic output command may include a recognition that transmission, reception, and/or origination of a haptic output command has occurred.

Transmitted haptic output commands may include haptic output commands transmitted from one processor to another, for e.g., from a processor of a computer system to a processor of a haptic enabled device and/or between two processors located in the same system or device. Haptic output commands may include haptic output commands transmitted directly from a processor to a haptic actuator.

Reception of haptic output commands may include haptic commands received by a first processor from a second processor. The first and second processors may be part of the same system or device and/or may also be located in different systems or devices.

Origination of a haptic output command may include the determination that a particular haptic output command is appropriate, based on executed software instructions. Thus, for example, a computer system executing software instructions for the play of a video game may originate a haptic output command for producing haptic effects based on the play of the video game.

Haptic output commands may further be part of haptic output tracks, the tracks comprising several haptic output commands in sequence. Such haptic output tracks may be recognized (e.g., received, transmitted, and originated) in the same fashion as haptic output commands, as discussed herein.

Haptic output commands transmitted between processors may be haptic information signals carrying information about haptic effects that are desired, including the type (e.g., rumble, vibrate, flex, etc.), magnitude, duration, frequency, pattern, and any other information necessary to describe a haptic effect. Haptic output commands configured to directly generate haptic effects when received by a haptic output device (e.g., a voltage signal transmitted to a haptic motor) may be referred to as haptic actuation signals. In some implementations, a processor receiving a haptic output command as a haptic information signal may interpret the received command and output a replacement haptic output command as an actuation signal directly to a haptic actuator.

In some implementations, a processor may generate a haptic output command as a haptic information signal and/or as a haptic actuation signal in response to executed software instructions.

For example, a haptic enabled device may include two haptic output devices, an ERM and an LRA. Each of these devices may have specific input requirements and specific output characteristics. A haptic enabled device processor may receive a haptic information signal from a computer system and output a haptic actuation signal configured to achieve the desired haptic effects of the haptic information signal as carried out by the specific haptic output device of the haptic enable device. In a second haptic enabled device, the same haptic information signal may be processed into a different haptic actuation signal due to differences in the characteristics of the haptic output devices associated with the second haptic enabled device.

In some implementations, a haptic output command in the form of a haptic actuation signal may be transmitted from one processor to another processor before being routed to the appropriate haptic output device.

The haptic output command recognition performed at haptic output command recognition operation 801 may determine whether one or more haptic output command has been received, transmitted, and/or originated within the most recent iteration of the control loop. Such a determination may be made on a continual iterative basis, e.g., as a part of a control loop.

After any haptic output commands occurring since the previous control loop iteration have been recognized, the fatigue level may be updated at operation 802. The fatigue level, as discussed above, may be based on at least one of a haptic effect density and measured user activity. The measured user activity may include measurements of control device use. Control device use may be characterized by user activation of controls associated with the control device and/or by an amount of time the control device is in use. The respective values of haptic effect density and control device use may be combined to determine the fatigue level. In some embodiments, only a value of a haptic effect density and/or only a value of control device use may be used. As discussed above, the computed value of haptic effect density may be determined from haptic output commands transmitted to haptic output devices and the value of control device use may be determined based on inputs received from the control device. Thus, a fatigue level indicative of an amount of user fatigue may be determined based on either or both of haptic output commands transmitted to the haptic output device and inputs received from the control device.

A fatigue level, as well as a haptic effect density and/or a control device use, may be calculated for the control system as a whole, for individual actuators, for individual user input elements, and/or for individual body parts subject to haptic effects. Fatigue level may be calculated for the control system as a whole by considering all of the haptic effects played by the system and/or all of the control device use within the system. Fatigue level may also be calculated separately for individual actuators, i.e., making separate fatigue level calculations, including both haptic effect density and/or control device use, for different actuators associated with a specific user input element. For example, if a user input element has each of a force-feedback actuator and a vibrotactile actuator, a fatigue level may be separately calculated for each. Fatigue level may be calculated for a specific user input element, i.e., combining fatigue level values including haptic effect density and/or control device use for all actuators associated with the specific user input element. Fatigue level including haptic effect density and/or control device use may also be calculated for individual body parts. For example, where user input elements are arranged with the intention that a particular body part operate more than one user input element, e.g., multiple buttons operated by a thumb, the fatigue level value of each button may be combined with the fatigue level values of the remaining buttons to produce a cumulative fatigue level value for the thumb intended to operate all of them.

Haptic effect density may be determined according to activations of one or more haptic output devices associated with monitored haptic enabled devices. Haptic effect density may also be determined according to haptic output commands transmitted by a processor for causing haptic effects. In some implementations, haptic effect density may be determined according to haptic output commands transmitted by a processor without knowledge of whether and how those haptic commands were executed by a haptic output device. For example, a video game controller may have two actuators on each side of the controller and two additional actuators in each trigger which can provide both vibrotactile and kinesthetic haptic feedback. In this example, each actuator may have its own calculated haptic effect density, and their respective haptic effect density values may also be combined as necessary.

Haptic effect density may be calculated using a variety of variables. These factors may include effect magnitude, effect duration, effect frequency or period, user preference settings for how much haptic feedback the user would like, and/or any other factor indicative of characteristics of one or more haptic effects that have previously been executed, e.g., previous haptic effects. In addition, haptic effect density calculations may include factors associated with control usage, such as how far a trigger is depressed, the percentage of throw or distance of the trigger in use, the strength of the actuator and subsequent impact force on a user's finger, and/or a user finger location on the trigger, for example. Furthermore, the haptic effect density may be modified by combining one or more factors with the others. For example, if a trigger is fully depressed, the perceived strength of a haptic effect conducted through the trigger may be reduced as compared to when a trigger is only halfway depressed. Thus, the calculated haptic effect density of a trigger vibration, for example, may be reduced for a fully depressed trigger as compared to half-way depressed trigger. Any or all of the above example factors may be combined to calculate a haptic effect density.

The effect of each haptic effect on a haptic effect density computation may be based on a haptic density accumulation factor and a haptic density decay factor. The haptic density accumulation factor represents how strongly a haptic effect contributes to the haptic effect density value, while the haptic density decay factor represents how quickly those contributions are removed from the haptic effect density value.

The haptic density accumulation factor of a haptic effect refers to the amount by which the effect raises a measure of haptic effect density, based on the above discussed factors. A haptic density accumulation factor may be considered a normalization factor, as it may serve to provide a measure of haptic effect density for haptic effects of different kinds and characteristics, allowing measurement on the same scale. For example, a haptic effect having a high magnitude and a long duration may have a higher haptic density accumulation factor than an effect of the same magnitude but of shorter duration. In another example, a haptic density accumulation factor may be used to normalize the addition to the haptic effect density from different types of haptic effects. For example, although vibrotactile effects and kinesthetic effects may be characterized by different parameters, each has a haptic density accumulation factor and thus these different types of effects can be measured on the same scale. Haptic effect density may be determined by a summation of haptic density accumulation factors for each haptic effect that has previously been played, as adjusted by the haptic density decay factors for each haptic effect that has previously been played.

Each haptic effect may also include a haptic density decay factor. A haptic density decay factor may be a measure of how quickly a haptic effect's influence on the haptic effect density diminishes. The haptic density decay factor may be determined by both the rate and type of decay of a haptic effect's influence on the haptic effect density over the designated decay period during which the haptic effect's influence lasts. A haptic effect may increase the haptic effect density based on the haptic density accumulation factor of the effect. The increase to the haptic effect density caused by the haptic effect may then be reduced over the designated decay period of the haptic effect, according to the rate of decay of the haptic density decay factor. In embodiments hereof, haptic density decay factors may be linear and may cause a reduction of haptic effect density at a constant rate over the designated decay period until the contribution of the decaying haptic effect reaches zero. In other embodiments hereof, haptic density decay factors may be exponential, causing a reduction of haptic effect density at an exponentially increasing or decreasing rate over the designated decay period. In other embodiments hereof, haptic density decay factors may be logarithmic, causing a reduction of haptic density at a logarithmically increasing or decreasing rate over the designated decay period. In other embodiments hereof, haptic density decay factor may also be binary, causing the entire contribution of a haptic effect to be removed all at once from the haptic effect density after the designated decay period. Haptic density decay factors may further include any other suitable mathematical function that may be applied to reduce the amount contributed to haptic effect density by a specific haptic effect. Haptic density decay factors, e.g. the rate and type of decay and the designated decay period, may be determined according to the nature of the haptic effect. For example, vibrotactile effects may have a different size and type of decay than kinesthetic effects.

In some embodiments, haptic density decay factors and designated decay periods for haptic effects may be dynamically adjusted according to user activity. Increased user activity may serve to lengthen a designated decay period and/or reduce the rate at which the haptic density decay factor reduces the contribution of a haptic effect to the haptic effect density. Thus, under conditions of high user activity, e.g., rapid trigger pulling or button pressing, the contribution to haptic effect density of any individual haptic effect may last longer and diminish at a slower rate.

As a specific example, a density range may go from 0 to 10, where 0 represents no haptic density/no fatigue and 10 represents maximum haptic density/maximum fatigue. In an example, maximum magnitude effects on a specific haptic output device, repeating at 10 ms intervals for 2 seconds may yield a haptic density accumulation factor of 3. An additional effect actuated at 100 ms at 35% magnitude may also yield a haptic density accumulation factor of 2. If the effects occurred close in time to one another, a haptic effect density of approximately 5 would result. If the effects have a linear haptic density decay factor of 30 seconds, the contribution of each effect to the fatigue level would immediately begin decaying at a constant rate such that, after 30 seconds, the contribution of each would be zero. In this example, after 15 seconds, the fatigue level would be approximately 2.5.

As discussed above, a fatigue level may include both haptic effect density computations and measures of control device use. A measure of control device use may reflect how long a user has been using a control device and/or how frequently the device has been used. Thus, a higher fatigue level may be determined for a user that has been operating a controller for a long period of time relative to a user that has been operating a controller for a shorter period of time. Measures of control device use may also include measures of how frequently a control device has been used, for e.g., how many trigger pulls, button presses, joystick/joypad movements, etc., have been performed. In some implementations, depth of trigger pulls, button presses, etc., may be included in measures of control device use. In some implementations, an amount of force required for each of these actions may be included in measures of control device use. Measures of control device use may be determined by control device use accumulation factors and control device use decay factors, similar to those described above with respect to haptic effects. That is, different control movements may contribute relatively higher amounts to a measure of control device use and each control movement may decay from a measure of control device use over time. Control device use decay factors may vary in size and type, including all of the same types as haptic density decay factors.

At operation 802, a fatigue level may be updated based on haptic effects and/or control device use that has occurred since the previous iteration and update of the fatigue level. Each haptic effect that has occurred may contribute to a value of a haptic effect density according to its haptic density accumulation factor. Each control device use may contribute to a value of control device use according to its control device use accumulation factor.

Furthermore, at operation 802, the haptic effect density and control device use measurement may be reduced according to the decay of contributions from haptic effects based on a time period since they have occurred. In some implementations, each haptic effect and control device use that contributes to the fatigue level may be stored according to their accumulation factors, decay factors, and a time of occurrence. In some implementations, all characteristics of a haptic effect and/or control device use that has occurred may be stored. Based on the decay factors, time of occurrence, and current time, the contribution of each haptic effect and/or control device use to the fatigue level, e.g., based on their accumulation factors, may be reduced to determine the current fatigue level.

As discussed above, the system may include additional sensors for collecting additional data for use in fatigue level calculations. For example, additional sensors may include biometric sensors. Biometric data from biometric sensors may be included in fatigue level calculations in some embodiments. For example, temperature changes in specific body parts may be indicative of increased or decreased blood flow as a result of haptic effects. Other biometric data may be monitored for computing fatigue levels, including, but not limited to, sweat levels, pupil dilation, galvanic skin response, and others. Each of these may measure stress and/or activity of a user, which may contribute to user fatigue. In some embodiments, the system may include additional force sensors in the housing of the controller.

Such force sensors may measure an amount of force a user employs to grip or hold the controller. Increased gripping force from activated muscle groups, such as with a clenched first or hand, may lead to increased user fatigue.

The fatigue level may be compared to a fatigue threshold at operation 803. The comparison between the fatigue level and the fatigue threshold may be used to determine whether or not haptic effects are to be modified. The fatigue threshold may include one or more threshold levels. A soft threshold level may be used to determine reductions of haptic effects. A hard threshold may be used to determine whether to eliminate one or more types of haptic effects. Based on the comparison between the fatigue level and a fatigue threshold, the system may determine to modify some or all haptic output commands, e.g., to reduce or eliminate planned haptic effects from haptic effect playback, and/or not to modify some or all haptic output commands.

Fatigue thresholds used in comparison with the fatigue level to determine haptic effect modifications may be predetermined, may be dynamically determined, and/or may be user defined. In some implementations, a predetermined fatigue threshold may be set according to a default setting determined according to average user fatigue experiences. In some implementations, a user may be permitted to adjust the predetermined fatigue threshold, allowing the threshold to be raised or lowered, depending on user preferences to set a user defined fatigue threshold. In some implementations, a user may be permitted to adjust thresholds for specific haptic output devices and/or for specific haptic effects. In some implementations, the fatigue threshold may be determined dynamically. Dynamic fatigue thresholds may be determined, for example, according to measured user activity. Increased user activity, including increased activity of a specific user input element, actuator, body part, and/or the entire controller, may lower the fatigue threshold required for haptic effect modification. Conversely, decreased user activity may raise the fatigue threshold required for haptic effect modification. For example, some gaming situations require rapidly repeated actions, e.g., rapid trigger pulls. This type of user activity may be used to dynamically adjust, e.g., lower, a fatigue threshold. Thus, while haptic effects associated with the rapid trigger pulling may cause the rapid accumulation of haptic effect density, the rapid trigger pulling may also cause the lowering of a dynamic threshold for haptic effect modification.

As discussed above, specific fatigue levels may be calculated for the control system as a whole, for individual actuators, for individual user input elements, and/or for individual body parts subject to haptic effects. Fatigue thresholds may likewise be specific to the control system as a whole, individual actuators, individual user input elements, and/or individual body parts. Each of these aspects may have an associated fatigue profile defining the fatigue threshold at which haptic effects will be modified for the specific aspect. For example, a fatigue threshold for comparing trigger fatigue levels may differ from a fatigue threshold for comparing joystick fatigue levels. Similarly, a fatigue threshold for thumb fatigue levels may differ from a fatigue threshold for index finger fatigue levels.

When a comparison between the fatigue level and the fatigue threshold determines that the fatigue threshold has been surpassed by the fatigue level, a determination to modify haptic effects may be made at operation 804. For instance, when the comparison determines that a soft threshold has been surpassed by the fatigue level, a haptic effect modification flag may be set. The haptic effect modification flag may act to signal a processor of the system (e.g., a processor of the computer system or of an associated haptic enabled device) to modify any or all haptic output commands to effectuate a reduction in the haptic density accumulation factor of the associated haptic effects. A haptic effect modification flag may be binary, indicating only whether or not haptic effects are to be modified. In this case, a modification amount for haptic effects may be predetermined and/or may be determined by a user. A haptic effect modification flag may also include a value, indicating an amount by which haptic effects are to be reduced. In some embodiments, the value of a haptic modification flag may be determined according to an amount by which a soft threshold is surpassed by a fatigue level. In another instance, when a comparison between the fatigue level and the fatigue threshold determines that a hard threshold has been surpassed by the fatigue level, the haptic effect modification flag may be set to indicate that future haptic effects are to be cancelled.

Haptic effect modifications may include changes to haptic output commands to modify the effects produced by haptic output devices. Such modifications may include adjustments to planned haptic effects so as to reduce their haptic density accumulation factors and thus reduce future haptic effect density levels. Thus, a haptic output command may be modified so as to reduce the intensity, magnitude, duration, and/or frequency of a haptic effect. Haptic output commands may be modified so as to reduce a haptic density accumulation factor of a planned haptic effect by a specific amount, to reduce haptic effects to a predetermined level, and/or to reduce haptic effects by a percent of the originally intended value. In some implementations, haptic output commands may be modified so as to modify the haptic density accumulation factor of individual haptic effects. For example, the total haptic density accumulation factor of a series of vibrations may be reduced by reducing the intensity and/or duration of each vibration in the series. In some implementations, haptic output commands may be modified so as to modify the haptic density accumulation factor of a grouping of individual haptic effects. For example, the total haptic density accumulation factor of a series of vibrations may be reduced by eliminating every other vibration.

In some embodiments, haptic effect modifications may include switching from an original haptic output track to a modified haptic output track. An original haptic output track may be the standard haptic output track used for causing unmodified haptic effects. When a haptic modification flag has been set and haptic effect modification is required, an alternative, modified haptic output track may then be used to cause modified haptic effects until the fatigue level has dropped below the threshold again. Both the original haptic output track and the modified haptic output track may be prerecorded.

In some embodiments, haptic effect modifications may include modifications to haptic output commands to decrease a control device use accumulation factor. For example, increasing throw or distance of a trigger pull may cause an increase in the control device use accumulation factor. A modification to a haptic output command may include reducing an amount of trigger throw required to cause a desired effect in a game being played by a user. A modification to a haptic output command may include assisting a user in a trigger pull by reducing an amount of force required for the pull and/or by using a force feedback haptic output device to provide force in helping the user complete the trigger pull. Similar modifications may be performed involving haptic output devices associated with other types of user input methods, including buttons and joysticks/joypads.

In some embodiments, haptic effect modifications may include modifications to haptic output commands to cause haptic effects at alternate actuators, alternate user input elements, and/or alternate body parts. When a fatigue level associated with a specific actuator, user input element, and/or body part has exceeded the fatigue threshold associated with that actuator, user element, and/or body part, the haptic effect may be implemented at a different actuator, user element, and/or body part. For example, where a user's right index finger is determined to have an associated fatigue level surpassing a fatigue threshold, haptic output commands may be modified to cause haptic effects intended for the right index finger to be experienced by the user's right thumb by activating an actuator located where a user's right thumb is intended to rest. Thus, the user experiences a haptic effect at least somewhat similar to the originally intended haptic effect without experiencing excessive fatigue in any one finger.

In some embodiments, haptic effect modifications may include substituting audio and/or other effects for the originally intended haptic effects. For example, where a fatigue level associated with an entire controller has exceeded a fatigue threshold, a haptic effect modification may include combining a rumble effect of lowered magnitude with an audio effect of increased magnitude.

When a comparison in operation 803 between the fatigue level and the fatigue threshold determines that the fatigue threshold is not surpassed by the fatigue level, a determination to not modify haptic output commands may be made at operation 805. When such a result occurs, any previously set haptic modification flags may be removed, and all future haptic effects may occur as initially intended until a new haptic modification flag is set.

In some implementations, the system may determine a plurality of haptic modification flags according to multiple haptic output device groups. As discussed above, control devices associated with the system may include more than one haptic output device. During the control loop 800 of the haptic modification determination process of FIG. 8, fatigue levels may be determined for multiple haptic output device groups, which may include groups for each haptic output device individually, groups of haptic output devices in combination, and/or groups for all haptic output devices in the control device. Each determined fatigue level may be compared to a fatigue threshold appropriate for the haptic output device group associated with it and the system may set individual haptic modification flags for each haptic output device group. Thus, in practice, for example, the system may determine that haptic output commands pertaining to a left trigger are to be modified while haptic output commands pertaining to a right trigger are to be left unmodified. In some implementations, a single process control loop 800 may be executed to determine haptic output modifications for all haptic output device groups. In some implementations, multiple process control loops 800 may be executed, each associated with determining haptic modifications for one or more haptic output device groups.

The control loop 800 of the haptic modification determination process of FIG. 8 is complete at loop repeat operation 806. The control loop then returns to haptic output command recognition operation 801, to determine whether haptic output commands have occurred since the previous haptic output command recognition operation 801.

The control loop 800 of the haptic modification determination process of FIG. 8 may therefore maintain a continuously updated determination of fatigue levels and, based on the fatigue levels, set haptic modification flags. The haptic modification flags may be referenced by processors associated with the system to determine whether or not to modify a haptic output command, as shown in haptic command process 900, illustrated in FIG. 9.

FIG. 9 illustrates a haptic command process 900, executable by one or more processors for modifying and outputting a haptic output command.

In an operation 902, a haptic output command may be determined by at least one processor associated with the computer system and/or a connected haptic enabled device. The determined haptic output command may be configured to cause one or more haptic effects by one or more haptic output devices associated with a haptic enabled device. The haptic output command may thus include instructions to activate a haptic output device to perform an original haptic effect. Determination of a haptic output command may include originating and/or receiving a haptic output command. Originating a haptic command may include, as discussed above, the generation of a haptic output command based on execution of software instructions. Receiving a haptic output command may include receiving a haptic output command by one processor from another processor.

In an operation 904, a haptic command modification status may be determined by at least one processor associated with the computer system and/or a connected haptic enabled device. The haptic command modification status may include information about whether and how to modify a specific haptic command. In the implementation of FIG. 9, the haptic command modification status may include information about whether and how to modify the haptic output command. As discussed above, haptic command modifications may include modifications to intensity, magnitude, frequency, and duration of one or more haptic effects specified by the haptic output command. Haptic command modifications may further include the elimination of one or more specified haptic effects. In some implementations, determination of a haptic command modification status may include checking a haptic modification flag corresponding to the determined haptic output command. For example, a haptic output command to provide a vibration haptic effect to a specific haptic output device may lead to a check of all haptic modification flags associated with the specific haptic output device. As discussed above, a haptic output device may be included in one or more haptic output device groups for modification flag purposes. Further, as discussed above, haptic modification flags may indicate the way in which a haptic command is to be modified, e.g., by reduction of an effect and/or cancellation of an effect. According to the haptic modification flag, a haptic command modification status may be determined.

In an operation 906, a replacement haptic output command may be determined by at least one processor associated with the computer system and/or a connected haptic enabled device. The replacement haptic command may be determined based on the haptic output command and the haptic command modification status.

Where the haptic command modification status indicates that no modification is required, the replacement haptic output command may be a haptic output command configured to cause the same haptic output effects as indicated by the original haptic output command. The original and replacement haptic output commands in this case may be identical. The original and replacement haptic output commands in this scenario may also differ. As described above, haptic output commands may differ according to their source and destination. For example, a processor associated with a haptic enabled device may receive a haptic output command from a processor associated with a computer system. The haptic enabled device processor may determine that no haptic effect modifications are necessary, based on the haptic command modification status, but may output a replacement haptic command that is altered for reception by haptic output devices associated with the haptic enabled device. For example, the haptic enabled device processor may receive a haptic information signal calling for a particular set of planned haptic effects. The haptic enabled device processor may process the haptic information signal and output a haptic actuation signal configured to cause the particular set of planned haptic effects when received by a haptic output device. Accordingly, in this situation, although the first received and second transmitted haptic output commands are different, the replacement haptic output command is not altered for haptic effect modification.

Where the haptic command modification status indicates that modification is required, the replacement haptic output command may be a haptic output command configured to cause modified haptic effects with respect to those indicated by the original haptic output command. Any and all haptic effect modifications discussed herein may be applied to a replacement haptic output command.

In some implementations, where the haptic command modification status indicates that haptic effect modification is required, the processor may, based on an override indicator of the original haptic output command, output a replacement haptic output command configured to cause the same haptic effects as indicated by the original haptic output command. For example, in a video game, a particular haptic effect may be so integral to the gameplay that modifying it would be deleterious to the user experience. Haptic output commands indicative of such haptic effects may include an override indicator. Upon identifying the override indicator, the processor may determine a replacement haptic output command indicating an original haptic effect despite a haptic command modification status indicating that effect modification is required.

In an operation 908, the replacement haptic output command may be output by at least one processor associated with the computer system and/or a connected haptic enabled device. As discussed above, the replacement haptic output command indicates a command to produce a haptic effect, and may be a command to produce a modified or unmodified haptic effect, depending on the outcome of operation 906. The replacement haptic output command may be output by the processor to directly or indirectly cause the modified or unmodified haptic effect. The replacement haptic output command may, for example, include a haptic control signal sent directly to a haptic output device to activate the haptic output device to cause actuation. The replacement haptic output command may also, for example, include a command sent indirectly to a haptic output device via another processor.

In an alternative implementation consistent with FIG. 9, fatigue levels may be updated and threshold comparison may occur when a haptic output command is received. In such implementations of the present system, the control loop 800 of the haptic modification determination process of FIG. 8 is not required. Instead, at operation 904, determining a haptic command modification status may include updating a fatigue level and comparing the updated fatigue level to a fatigue threshold to determine whether to modify the haptic output command. Fatigue level updating and threshold comparison may occur when a haptic output command is received. In such an implementation, a fatigue level may be updated in the same manner as described with respect to operation 802. All previous haptic effects that have occurred since the previous fatigue level update may be processed to update the fatigue level according to their respective haptic density accumulation factors. Control device use since the previous fatigue level update may be processed to update the fatigue level according to respective control device use accumulation factors. The fatigue level may further be updated according to the haptic density decay factors, control device use decay factors, and elapsed time since the occurrence of the respective haptic effects and control device uses. After updating, the fatigue level may be compared to a fatigue threshold, similarly to the above description with respect to operation 803, to determine a haptic command modification status. The determined haptic command modification status may include information about whether and how to modify the original haptic output command. As discussed above, haptic command modifications may include modifications to intensity, magnitude, frequency, and duration of one or more haptic effects specified by the haptic output command. Haptic command modifications may further include the elimination of one or more specified haptic effects.

Figure 10:
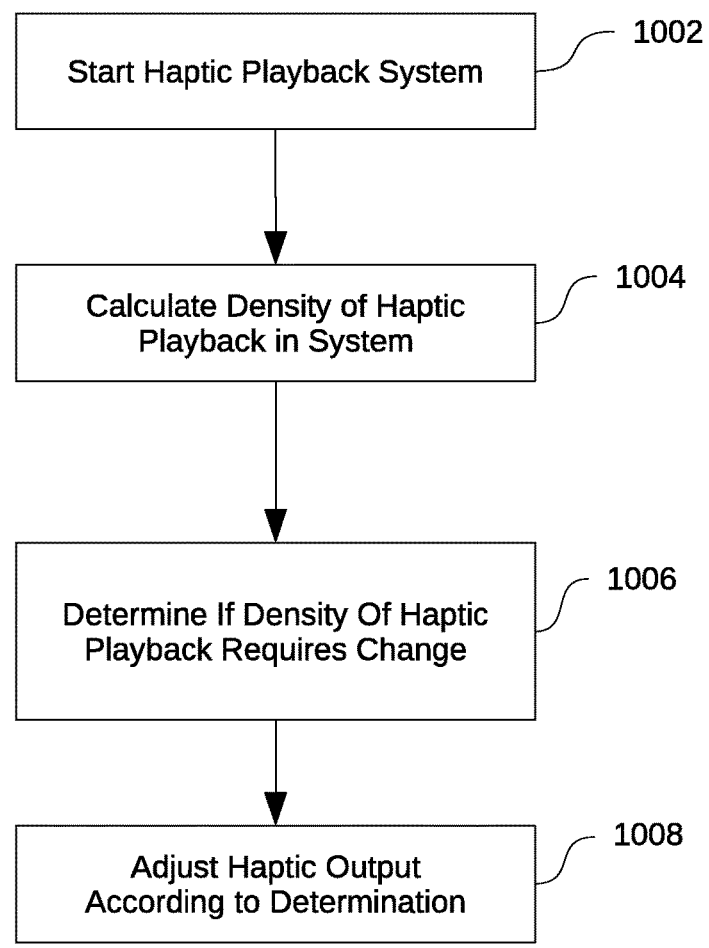
FIG. 10 is a process diagram illustrating operation of a system for modifying haptic effects consistent with an embodiment hereof.

FIG. 10 is a process diagram illustrating operation of a system for modifying haptic effects consistent with an embodiment hereof. Haptic system command process 1000 is executable by one or more processors for modifying the haptic density within a system. Haptic system command process 1000 may run continuously during use of a haptic playback system, continuously calculating haptic densities and adjusting haptic output levels as necessary.

In an operation 1002, the haptic playback system is started. The haptic playback system includes the various haptic enabled devices in use with the system. For example, the haptic playback system may include the haptic enabled triggers, buttons, and joysticks of one or more single or two-handed controllers, as shown in FIGS. 2-4, as well as any rumble type vibration actuators included therein.

In an operation 1004, the haptic effect density, which with reference to FIG. 10 may also be referred to as the density of the haptic playback or the haptic playback density, may be calculated. The density of haptic playback may be calculated for the system as a whole, for each individual haptic enabled device within the system, and for specific user body parts. For example, in a system including a controller having left and right rumble devices as well as left and right haptically enabled triggers, each rumble device and trigger may have its own haptic effect density while the combination of all of the devices may represent the haptic effect density of the entire system. Where the system includes a controller having multiple manipulandum intended for use by the same body part, e.g., a right trigger and a right bumper intended to be activated by a right index finger, the system may combine the haptic effect density associated with both the trigger and the bumper to determine the haptic effect density experienced by the right index finger. The haptic effect density may be calculated according to magnitudes, durations, and frequency or period of the executed haptic effects. For haptically enabled force-feedback triggers, haptic effect density may be calculated according to a percentage of trigger depression, a percentage of throw or distance of trigger movement, the amount of an impact force against a user's fingers, a user finger location on the trigger, and others. Each executed haptic effect may contribute to the haptic playback density for a designated time period, e.g., decay period, after execution. During the decay period, the contribution of the specific haptic effect to the haptic playback density may be reduced based on the time since execution. In some implementations, the contribution of the specific haptic effect to the haptic playback density may remain the same throughout the decay period. After expiration of the decay period, each haptic effect's contribution to the playback density is eliminated.

In an operation 1006, the system may determine if the density of haptic playback in the system requires adjustment. The adjustment determination may be made based on a comparison between the calculated haptic playback density of the entire system and either a predetermined density threshold or a user preference density threshold. Where the haptic playback density exceeds the threshold, the determination to reduce the density of haptic playback may be made. Where the haptic playback density does not exceed the threshold, the determination to increase the density of haptic playback to correspond with default, or original haptic output levels may be made.

In an operation 1008, the system may adjust haptic output levels according to the determination performed at operation 1006. Where the haptic playback density has exceeded the threshold (either predetermined or user preferred), haptic output levels may be adjusted so as to reduce the future haptic playback density. Haptic output levels may be adjusted by altering the magnitude, duration, and frequency or period of each haptic effect. In the case of force feedback triggers, an allowable throw distance may be reduced by a percentage of a maximum throw distance. For example, the force feedback actuators may limit the total distance available for each trigger pull. At the conclusion of operation 1008, the system flow may return to operation 1004, to calculate the haptic playback density.

During execution of the haptic command process 1000, other system actions, such as game-play, may continue separately from the haptic command process 1000. The haptic command process 1000 may continuously loop through operations 1004, 1006, and 1008, calculating the current haptic playback density and adjusting haptic output levels up or down accordingly.

FIG. 11 is a process diagram illustrating operation of a control loop for modifying haptic effects consistent with an embodiment hereof. Haptic control loop 1100 is executable by one or more processors for modifying the haptic effect density within a system.

In an operation 1102, it is determined whether a haptic effect is currently being executed. If the determination is made that an effect is currently being executed, then, in an operation 1103, a haptic density accumulation factor, also referred to as a density value or rating of the effect, is added to the total haptic effect density or fatigue value in the system, and the control loop may return to operation 1102 to continue checking for haptic effect execution or advance to operation 1105 to determine whether the haptic effect, or previous haptic effects, have occurred within their designated decay periods or decay thresholds, as discussed below.

If the determination is made that no effect is playing at operation 1102, then, in an operation 1104 the density values or ratings of recently executed haptic effects may be determined. These density values or ratings may then be assessed based on their haptic density decay factors, to determine whether the effect has occurred within its designated decay period or decay threshold, at operation 1105. The haptic density values or ratings of effects played within the designated decay period may continue to contribute to the total haptic effect density value, at operation 1103. In some implementations, these haptic effect density ratings may be reduced according to a time since execution, i.e., according to decay rate over a designated decay period. The haptic effect density ratings of effects played outside of the designated decay period may be removed from the haptic effect density value, and the haptic effect density value may be reduced by an appropriate amount at operation 1106.

In an operation 1107, the total haptic effect density value may be compared to a predetermined fatigue, threshold, a dynamic fatigue threshold, and/or a user defined fatigue threshold to determine whether the haptic effect density value remains within acceptable parameters. Where the haptic effect density value exceeds a threshold, further, next or future haptic effects may be modified, e.g., reduced, weakened, or eliminated, at operation 1109. Where the haptic effect density value does not exceed the threshold, further, next or future haptic effects may remain unmodified at operation 1108. Following operations 1109 or 1108, control may return to the start of haptic control loop 1100.

Thus, there is provided systems, devices, and methods of performing haptic effect modification according to fatigue levels indicative of user fatigue. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. Stated another way, aspects of the above methods of rendering haptic effects may be used in any combination with other methods described herein or the methods can be used separately. All patents and publications discussed herein are incorporated by reference herein in their entirety.

What is claimed is:

1. A device for modifying haptic effects of a haptic enabled device, comprising:
    at least one processor configured to execute computer instructions to:
        determine a haptic output command including instructions to activate a haptic output device to perform an original haptic effect,
        determine a fatigue level indicative of an amount of user fatigue based on at least one of haptic output commands transmitted to the haptic output device and inputs received from a control device,
        compare the fatigue level to a predetermined fatigue threshold, and
        determine a replacement haptic output command including instructions to activate the haptic output device to perform a modified haptic effect, instead of the original haptic effect, based on the comparison of the fatigue level to the predetermined fatigue threshold.

2. The device of claim 1, wherein the fatigue level is determined based on a haptic effect density determined according to characteristics of previous haptic effects output by the haptic output device, the characteristics including at least one of a frequency, a magnitude, and a duration of the previous haptic effects.

3. The device of claim 2, wherein the at least one processor further includes instructions to:
increase a value of the haptic effect density according to the characteristics of the previous haptic effects.

4. The device of claim 2, wherein the at least one processor further includes instructions to:
decrease a value of the haptic effect density according to an elapsed time since the occurrence of the previous haptic effects.

5. The device of claim 1, wherein the at least one processor further includes instructions to: increase the fatigue level according to measured user activity including at least one of activation of controls associated with a control device and an amount of time using the control device.

6. The device of claim 5, wherein the at least one processor further includes instructions to: decrease the fatigue level according to an amount of time since a most recent activation of controls associated with the control device.

7. The device of claim 1, wherein the processor instructions to determine the replacement haptic output command include instructions to determine the replacement haptic output command including instructions to generate the modified haptic effect, the modified haptic effect including a reduction of at least one of a magnitude, a duration, and a frequency of the original haptic effect.

8. The device of claim 1, wherein the processor instructions to determine the replacement haptic output command include instructions to eliminate the original haptic effect.

9. The device of claim 1, wherein the processor instructions to determine the replacement haptic output command include instructions to provide haptic assistance to the user.

10. The device of claim 1, wherein the at least one processor further includes instructions to receive user input to determine the predetermined fatigue threshold.

11. The device of claim 1, wherein the device includes the haptic output device.

12. The device of claim 11, wherein the device includes a control device.

13. The device of claim 1, further comprising a haptic communication unit configured for:
connecting to a haptic enabled device including a haptic actuator, and
outputting the haptic output command to the connected haptic enabled device.

14. A computer-implemented method for modifying haptic effects, the method to be carried out by at least one processor executing computer instructions, the method comprising:
determining, by the at least one processor, a haptic output command including instructions to activate a haptic output device to perform an original haptic effect,
determining, by the at least one processor, a fatigue level indicative of an amount of user fatigue based on at least one of haptic output commands transmitted to the haptic output device and inputs received from a control device,
comparing, by the at least one processor, the fatigue level to a predetermined fatigue threshold, and
determining, by the at least one processor, a replacement haptic output command including instructions to activate the haptic output device to perform a modified haptic effect, instead of the original haptic effect, based on the comparison of the fatigue level to the predetermined fatigue threshold.

15. The computer-implemented method of claim 14, wherein the fatigue level is determined based on a haptic effect density determined according to characteristics of previous haptic effects output by the haptic output device, the characteristics including at least one of frequency, magnitude, and duration of the previous haptic effects.

16. The computer-implemented method of claim 15, further comprising:
increasing the haptic effect density according to the characteristics of the previous haptic effects.

17. The computer-implemented method of claim 15, further comprising:
decreasing the haptic effect density according to an elapsed time since the occurrence of the previous haptic effects.

18. The computer-implemented method of claim 14, further comprising:
increasing the fatigue level according to measured activity of a user including at least one of activation of controls associated with a control device and an amount of time using the control device.

19. The computer-implemented method of claim 18, further comprising:
decreasing the fatigue level according to an amount of time elapsed since a most recent activation of controls associated with the control device.

20. The computer-implemented method of claim 14, wherein determining the replacement haptic output command includes determining the replacement haptic output command including instructions to generate a modified haptic effect, the modified haptic effect including a reduction of at least one of a magnitude, a duration, and a frequency of the original haptic effect.

21. The computer-implemented method of claim 14, wherein determining the replacement haptic output command includes eliminating the original haptic effect.

22. The computer-implemented method of claim 14, wherein determining the replacement haptic output command includes determining the replacement haptic output command to include instructions to provide haptic assistance to a user.

23. The computer-implemented method of claim 14, further comprising receiving user input to determine the predetermined fatigue threshold.

24. The computer-implemented method of claim 14, wherein the at least one processor is included within a haptic enabled device including the haptic output device.

25. The computer-implemented method of claim 24, wherein the haptic enabled device further includes a control device.

26. The computer-implemented method of claim 14, wherein the at least one processor is included within a computing device comprising a haptic output port configured for:
connecting to a haptic enabled device including the haptic output device, and
outputting the haptic output command to the connected haptic enabled device.

* * * * *